US012613354B2

(12) United States Patent
Krishna et al.

(10) Patent No.:    US 12,613,354 B2
(45) Date of Patent:        Apr. 28, 2026

(54) SPARSE OCEAN BOTTOM NODES AND MINI-STREAMER ACQUISITION SYSTEM FOR ENHANCING SUBSURFACE IMAGING

(71) Applicant: CGG SERVICES SAS, Massy Cedex (FR)

(72) Inventors: Hari Krishna, Crawley (GB); Shuo Ji, Katy, TX (US)

(73) Assignee: CGG SERVICES SAS, Massy Cedex (FR)

( * ) Notice: Subject to any disclaimer, the term of this patent is extended or adjusted under 35 U.S.C. 154(b) by 0 days.

(21) Appl. No.: 18/609,349

(22) Filed: Mar. 19, 2024

(65) Prior Publication Data

US 2024/0219597 A1     Jul. 4, 2024

Related U.S. Application Data

(63) Continuation of application No. 17/743,078, filed on May 12, 2022, now Pat. No. 11,966,000.

(60) Provisional application No. 63/189,831, filed on May 18, 2021.

(51) Int. Cl.
G01V 1/38             (2006.01)

(52) U.S. Cl.
CPC .......... G01V 1/3808 (2013.01); G01V 1/3852 (2013.01); *G01V 2210/1423* (2013.01); *G01V 2210/1427* (2013.01); *G01V 2210/169* (2013.01)

(58) Field of Classification Search
None
See application file for complete search history.

(56) References Cited

U.S. PATENT DOCUMENTS

| | | | | |
|---|---|---|---|---|
| 5,247,486 | A | 9/1993 | Regnault | |
| 8,593,904 | B2 | 11/2013 | Soubaras | |
| 11,782,178 | B2 * | 10/2023 | Wallace | G01V 1/3852 367/21 |
| 2009/0296520 | A1 * | 12/2009 | Keers | G01V 1/364 367/20 |
| 2012/0155217 | A1 | 6/2012 | Dellinger et al. | |
| 2016/0097870 | A1 | 4/2016 | Routh et al. | |

(Continued)

FOREIGN PATENT DOCUMENTS

| | | |
|---|---|---|
| GB | 2567059 A | 4/2019 |
| WO | 2018217872 A1 | 11/2018 |

(Continued)

OTHER PUBLICATIONS

Andrew Long, "What Does 'Sparse' Really Mean Anyway? Ocean Bottom Nodes, Towed Streamers and Imaging," Industry Insights, Jan. 20, www.pgs.com, 7 pages.

(Continued)

*Primary Examiner* — Hovhannes Baghdasaryan
(74) *Attorney, Agent, or Firm* — PATENT PORTFOLIO BUILDERS PLLC

(57)            ABSTRACT

A correlated sparse nodes and mini-streamers system for collecting seismic data includes plural nodes distributed on the ocean bottom, and a mini-streamer spread that includes plural mini-streamers. The plural nodes and the mini-streamer spread are configured to simultaneously collect seismic data from a surveyed subsurface, and wherein a length of the mini-streamers is equal to or less than three times an inline distance between adjacent nodes of the plural nodes.

15 Claims, 9 Drawing Sheets

(56)     References Cited

U.S. PATENT DOCUMENTS

| 2016/0187504 A1 | 6/2016 | Brenders et al. |
| 2019/0064380 A1 | 2/2019 | Sharma |
| 2020/0393591 A1 | 12/2020 | Beitz et al. |
| 2021/0215844 A1 | 7/2021 | West et al. |

FOREIGN PATENT DOCUMENTS

| WO | 2020197403 A1 | 10/2020 |
| WO | 2021162987 A1 | 8/2021 |

OTHER PUBLICATIONS

Krey, Th C., "Attenuation of random noise by 2D and 3D CDP stacking and Kirchhoff migration," Geophysical Prospecting, 1987, vol. 35, No. 2, pp. 135-147.

Nick Moldoveanu et al., "Marine acquisition using autonomous marine vehicles: A field experiment," SEG Denver 2014 Annual Meeting, 2014, pp. 163-167.

Office Action in related/corresponding GB Application No. 2207137.7 dated Nov. 3, 2022.

Partha Routh et al., "Impact of high-resolution FWI in the Western Black Sea: Revealing overburden and reservoir complexity," The Leading Edge, Jan. 2017, pp. 60-66.

Rongxin Huang et al., "Full-waveform inversion for full-wavefield imaging: Decades in the making," The Leading Edge, May 2021, vol. 40, No. 5, pp. 324-334.

Rui Zhong et al., "Incorporating Streamer Data for OBN Free-Surface Multiple Prediction—A Case Study in Deep-Water Gulf Of Mexico." 2014 SEG, SEG Denver 2014 Annual Meeting, pp. 4108-4112.

Shuki Ronen et al., "Technology and economy of ocean bottom nodes on the first anniversary of the first 5C crew," Jan. 2009, Conference: SEG Technical Program Expanded Abstracts, 4 pages.

Office Action in related/corresponding Egyptian Application No. 6272022 dated Feb. 11, 2024.

* cited by examiner

SPARSE OCEAN BOTTOM NODES AND MINI-STREAMER ACQUISITION SYSTEM FOR ENHANCING SUBSURFACE IMAGING

BACKGROUND

Technical Field

Embodiments of the subject matter disclosed herein relate to a system and method for using a combination of ocean bottom node data and streamer data for imagining the subsurface of a body of water, and more specifically, to combining sparse ocean bottom nodes and short streamers to reduce acquisition time and cost associated with a seismic survey.

Discussion of the Background

Probing underground formations in search of hydrocarbon resources is an ongoing process driven by continually increasing worldwide demand. Seismic surveys are used for exploration, hydrocarbon reservoir field development, and production monitoring (time lapse). The probed underground formations are made of volumes of rocks with different attributes (permeability, shear and compressional wave velocities, porosity, etc.). The oil and gas is found in pores and fractures ranging from microscopic fissures to kilometer-wide networks creating complex paths for fluid movement. The acquired seismic data is thus processed to generate images of geophysical structures and extract seismic attributes under the ground or the seafloor, i.e., the subsurface, to identify the oil and gas reservoirs.

Seismic surveys are performed on land and in marine environments. FIG. 1 illustrates equipment used during a marine seismic survey. A vessel 110 tows plural detectors or receivers (also called "seismic sensors") 112, which are disposed along a flexible cable 114 (typically several kilometers long). Those skilled in the art use the term "streamer" (labeled 116) for the cable and its corresponding detectors. A vessel usually tows plural streamers at predetermined crossline intervals (crossline being a direction perpendicular to the towing direction), with the streamers forming a spread in the horizontal (XY) plane. A typical streamer is longer than 4,000 m. Streamer 116 is towed at a substantially constant depth $z_1$ relative to the water surface 118. However, streamers may be towed at a slant (i.e., to form a constant angle) with respect to the water surface, or may have a curved profile as described, for example, in U.S. Pat. No. 8,593,904, the entire content of which is incorporated herein by reference. Each streamer is normally equipped with compasses, acoustic pingers, steering devices (known as "birds") and depth sensors that give continuous location information and control over heading, position and depth.

Vessel 110 (or another vessel) may also tow a seismic source 120 configured to generate acoustic waves 122a. Note that, in this document, the terms "acoustic" and "seismic" are interchangeably used to indicate the same type of mechanical energy propagation (i.e., waves). Acoustic waves 122a propagate downward and penetrate the seafloor 124. For simplicity, FIG. 1 shows only two paths 122a corresponding to source-emitted acoustic waves. When encountering a layer interface 126 (different impedance in different layers), the acoustic waves are at least partially reflected. The reflection at reflector R is characterized by an incidence/reflection acute angle formed by the incoming or reflected wave and a vertical direction, and an azimuth angle $\omega$ (not shown since FIG. 1 is a vertical view and $\omega$ is in a horizontal plane) between the reflected wave's projection in the horizontal plane and a reference direction (e.g., x-North).

The reflected acoustic waves 122b and 122c propagate upward. The reflected acoustic wave 122b is received by one of detectors 112, while the reflected wave 122c passes by the detectors and is reflected back at the water surface 118 (the interface between the water and air serving as a quasi-perfect reflector to mirror acoustic waves). Wave 122d, which is wave 122c's reflection due to the water surface, travels downward and is then also detected. The detectors record amplitude versus time series, known as traces, which are processed to generate a reflectivity image of the underground structure 124 and, in particular, the location of reflectors 126. The traces are recorded as seismic data.

Unlike the marine seismic acquisition system in FIG. 1 in which the detectors are moving while housed inside towed streamers, a water-bottom or a land seismic acquisition system as shown in FIG. 2 has detectors, known as ocean bottom nodes (OBN) 200 placed over the water-bottom surface 218. One or more sources 220 are towed by a vessel 210 above the OBN 200 and generate sound waves 222, similar to the waves 122A in FIG. 1. These waves also propagate into the subsurface 226 and get reflected at various interfaces or reflectors R, and the reflected waves are recorded by the OBN 200. In these different data acquisition geometries, the detectors similarly record traces, and the reflections are characterized by incidence and azimuth angles.

The principle of the acquisition of the seismic data (with streamers or OBN) is to sample the targeted area by traversing programmed adjacent and parallel sail lines 228 over the targeted area as discussed above with regard to FIGS. 1 and 2. To obtain reliable and good quality seismic images of the surveyed subsurface, the seismic data needs to be acquired continuously over the area. The quality of the distribution of the sources 120/220 and the receivers' positions during the acquisition is monitored by the analysis of the surface-derived seismic coverage on the bin grid. The recorded seismic wavefield is subsequently processed in multiple steps (pre-processing, velocity model building and imaging) to create an image of the subsurface.

Ocean bottom datasets (called herein "node datasets") acquired as illustrated in FIG. 2 or using other methodologies, (node on a rope, remote operated vehicle (ROV) based systems, drop-node, cable systems, permanent monitoring, etc.) are well known to create significant improvements in subsurface imaging, when appropriately processed and imaged, due to full azimuth illumination, zero offsets, long offsets, better signal to noise ratio (especially for low frequencies), and the multicomponent nature of the data acquired. These data sets are highly desired due to the superior definition of the subsurface that cannot be achieved even with the use of multi azimuth or wide azimuth towed streamer datasets, especially in complex geological settings.

However, high-density ocean bottom seismic data acquisition has remained a niche, restricted to small isolated areas, due to the exponential costs associated with node density required to adequately sample the subsurface for optimal imaging. In this regard, note that a traditional node dataset is acquired with an inline distance ID between the nodes of about 100 m, and a cross-line distance CD between the nodes not larger than 400 m, as illustrated in FIG. 2. The axes X and Y in FIG. 2 indicate the inline and the crossline directions, respectively. The inline direction is considered to be the direction parallel to the sail line 228, i.e., the direction followed by the vessel 222 that tows the sources 220, while the cross-line direction is considered to be perpendicular to the inline direction, in a plane substantially parallel to the water surface.

In recent years, sparser Ocean Bottom Seismic (OBS) data (i.e., having a cross-line distance between nodes larger than 400 m) acquisition have gained significant momentum. However, the main goal of these sparse OBS surveys is limited to a better definition of the subsurface velocity field, which leads to a potentially improved towed streamer image. The sparsity of the acquisition limits the potential of the OBS data to create a standalone high-resolution subsurface image due to sampling requirements for optimal imaging. Recent efforts are directed to simultaneously acquiring long offset streamer dataset and OBN data for new seismic surveys.

However, the inventors have observed that the underlying principles of seismic acquisition have not changed significantly, and this can be equated to a separate streamer and a sparse node survey with a zero time lag between both. There are improvements to source utilization (e.g., wide tow, multiple sources) by sharing them between the surveys. For example, US patent publication applications 2019/0064380A1, US2020/0393591A1 and WO2020/197403A1 have a common theme of sharing the seismic source from a typical long offset marine streamer seismic acquisition vessel, while a distribution of nodes is present on the ocean floor, to simultaneously acquire the marine streamer and OBN datasets.

The inventors have noted the following limitations associated with these approaches. The OBN data acquisition is inherently expensive due to the need to place the node stationarily on the sea floor and then recover them, at intervals, to retrieve the data. Both these steps are very slow compared to streamer surveys, which are normally 4-8 times faster to cover the same unit area. To improve cost efficiency, OBN surveys typically densely sample on the source effort as it is relatively inexpensive to do so. The combination used for a particular survey is decided after a comprehensive modelling approach. Even with this approach, receiver spacing in a node survey, especially orthogonal to the source shooting direction (crossline) is typically 3-9 times sparser than the equivalent streamer survey. This bigger crossline separation leads to a crossline offset increment 3-9 times larger than narrow azimuth streamer's offset increment, depending on the number of sources. Given the fact that nodes are on seafloor, for OBN data both primary energy (up-going energy) and receiver side first order multiple (down-going energy) can be used for imaging purpose. Comparing OBN upgoing energy and streamer data, for the same surface offset, OBN upgoing energy will have bigger reflection angle than streamer data, with actual reflection points closer to receivers, asymptote to mid-point for very deep reflectors. The OBN down-going energy will have smaller reflection angle than upgoing streamer primary data, with reflection points closer to shots, asymptote to mid-point for very deep reflectors.

Sparser node surveys, typically acquired with 600-1200 m crossline receiver line spacing, create significant challenges for it to be used as a standalone sub-surface imaging option, especially in resolving details in the shallow overburden, which can significantly impact overall imaging quality. Main challenges are observed in Common Offset Vector (COV) domain processing related to sampling and signal to noise ratios, challenges in velocity model building due to inadequate sampling for RMO picks and finally imaging challenges related to spatial sampling. Spatial aliasing impacting imaging of steeply dipping structures (e.g., salt bodies) is another challenge. These issues also create significant challenges in extracting attributes from the seismic data (AVO inversion, coherence, dip and spectral decomposition etc.).

Some examples will be used to help illustrate the two challenges from sparse node survey. The $1^{st}$ challenge: large minimum offset linked to increased crossline receiver line spacing leads to inferior near angle coverage. The $2^{nd}$ challenge: the offset increment determined by node spacing leads to too sparse reflection angle sampling especially for shallow reflectors and/or steep dips.

Looking at the $1^{st}$ challenge, the shot lines near the centre of two adjacent node lines will have large minimum offset around half of node line spacing. In case of 900 m node receiver line spacing, the minimum offset (measured in XY plane) for those shot lines at the centre of two node receiver lines is ~450 m. Even assuming a flat geology and constant velocity, with water bottom (WB) at depth 300 m and a shallow reflector at 600 m, for up-going energy, the expected reflection angle is ~26° for reflector at 600 m; for down-going energy, reflection angle ~26° at WB, and reflection angle ~16° for reflector at 600 m. As the minimum offset is determined by the distance between shot and receiver in the XY plane, this problem cannot be mitigated by shot density or OBN inline density. The limited reflection angle range due to receiver spacing puts limits on imaging the overburden complexities and in case of shallow targets, creates critical limitations on the ability of data being used for imaging. This can be routinely noticed in existing sparse node surveys where the sparse OBN data is used to feed the velocity model and does not directly contribute towards imaging the subsurface, especially for shallow targets.

In general, for an OBN survey, node spacing is bigger than shot spacing, and the offset increment in both inline and crossline directions is determined by wave field sampling by the node spacing. Let's look at the $2^{nd}$ challenge, to study the reflection angle sampling linked to node spacing. Assuming the node inline spacing is 300 m and crossline spacing 900 m, this leads to OBN dataset inline offset (offset x) increment 600 m and crossline offset (offset y) increment 1800 m. For this challenge, a 300 m WB depth is considered, and a shallow flat reflector at 600 m, with constant velocity. With 600 m offset x increment, for up-going energy, the first offset x class (value 0 m to 600 m) will cover reflection angle 0° to 33° for reflector at 600 m if offset y is 0 m (shot line right above node line); for down-going energy, the first inline offset class will cover reflection angle 0° to 22° for reflector at 600 m if offset y is 0 m. Since offset y increment is larger, the reflection angle sampling will be even sparser along crossline direction. It is clear the reflection angle increment for shallow geologies is too big between neighbouring offset classes for curvature picking or seismic attributes extraction.

Under the same flat geology and constant velocity assumption, 300 m water depth, node inline spacing 300 m, offset y=0, traces with offset x (0 m, 600 m, 1200 m, 1800 m), for reflector at 600 m, up-going wave reflection angles are (0°, 34°, 53°, 63°), down-going wave reflection angles are (0°, 22°, 39°, 50°); for reflector at 1200 m, up-going wave reflection angles are (0°, 16°, 30°, 41°), down-going wave reflection angles are (0°, 13°, 24°, 34°). It is possible to verify that for the given reflector as offset value increases, the same offset increment will map to smaller reflection angle increment for both up- and down-going waves, and as reflector depth gets larger, the same offset will map to smaller reflection angle as well. In real data, more factors will affect the mapping between surface offset and reflection angle, but the overall trend from above simple example is valid. It is possible for given acquisition geometry to get smaller minimum near angle and denser angle sampling by utilizing surface multiples for both streamer and OBS datasets, but the cross-talk between different order of multiples and ability to produce gathers for AVO/AVA are very complex challenges to handle with the current technologies.

The previously mentioned references require a typical long offset marine seismic streamer vessel together with the node placement on the ocean floor for data acquisition. The subsurface sampling is very dependent on the width and number of sources used, source tow width, streamer spacing, inline streamer receiver spacing, cable length, additional long offset acquired for the nodes (if any), and the sail line spacing between adjacent lines. This would also mean that the resulting dataset is likely to be heavily blended as simultaneous source acquisition would be required for overall cost efficiency, streamer subsurface sampling and minimum streamer vessel speeds to ensure stable tow depth coupled with equipment, material and personnel safety. In any case, the methodology will result in a new towed streamer dataset which is not desirable in most cases, especially in mature basins where large volumes of towed streamer seismic data already exist. The length and width of the towed streamer spread can limit the acquired coverage, especially around existing infrastructure, e.g., oil and gas platforms. The number of towed active sources on a single vessel is inversely proportional to the available source volume per active source and this can further limit the inline sampling with the same source, due to air flow limitations to the source, leading to potentially sub-optimal illumination and subsurface sampling for seismic imaging. The coupling of the streamer and OBN sampling can limit the potential for a variable geometry for the nodes in different areas within the survey area. Sampling variability is a commercially advantageous solution to cater to varying complexity within the total survey area. Typical sail line spacing, that defines native streamer source sampling, is half of the receiver spread width. This is inversely proportional to the source width and number of sources.

Thus, there is a need for a new system and method that is capable of optimizing the subsurface sampling using OBN and streamers by acquiring distinctive and complimentary datasets, which may further be enriched by existing seismic data, previously collected, using towed streamers or OBNs.

BRIEF SUMMARY OF THE INVENTION

According to an embodiment, there is a correlated sparse nodes and mini-streamers system for collecting seismic data, and the system includes plural nodes distributed on the ocean bottom, and a mini-streamer spread that includes plural mini-streamers. The plural nodes and the mini-streamer spread are configured to simultaneously collect seismic data from a surveyed subsurface. A length of the mini-streamers is selected to be equal to or less than three times an inline distance between adjacent nodes of the plural nodes.

According to another embodiment, there is a correlated sparse nodes and mini-streamers system for collecting seismic data, and the system includes plural nodes distributed on the ocean bottom, a mini-streamer spread that includes plural mini-streamers, plural sources configured to generate sound waves, and a vessel configured to simultaneously tow the plural sources and the mini-streamer spread above the plural nodes. A length of the mini-streamers is selected to be equal to or less than three times an inline distance between adjacent nodes of the plural nodes.

According to yet another embodiment, there is a method for processing seismic data acquired over a body of water, and the method includes receiving sparse node seismic data acquired with plural seismic nodes distributed over the ocean floor; receiving mini-streamer spread data acquired with plural mini-streamers towed with a vessel above the plural seismic nodes; combining the sparse node seismic data and the mini-streamer spread data; and processing the combined sparse node seismic data and mini-streamer spread data to generate an image of the subsurface. A length of the plural mini-streamers is equal to or less than three times an inline distance between adjacent nodes of the plural nodes.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
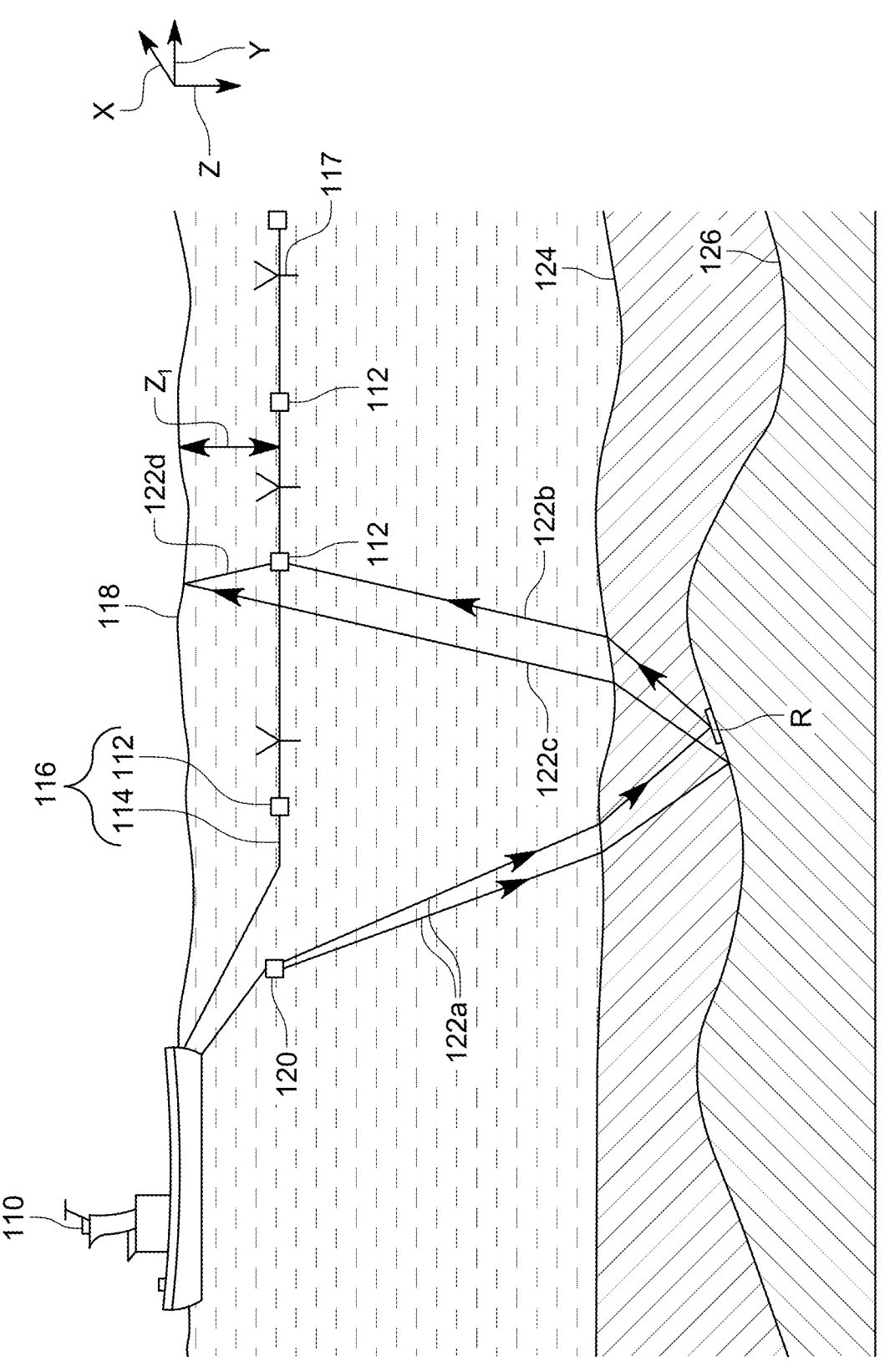
FIG. 1 is a schematic illustration of a seismic data acquisition system that uses streamers.
Figure 2:
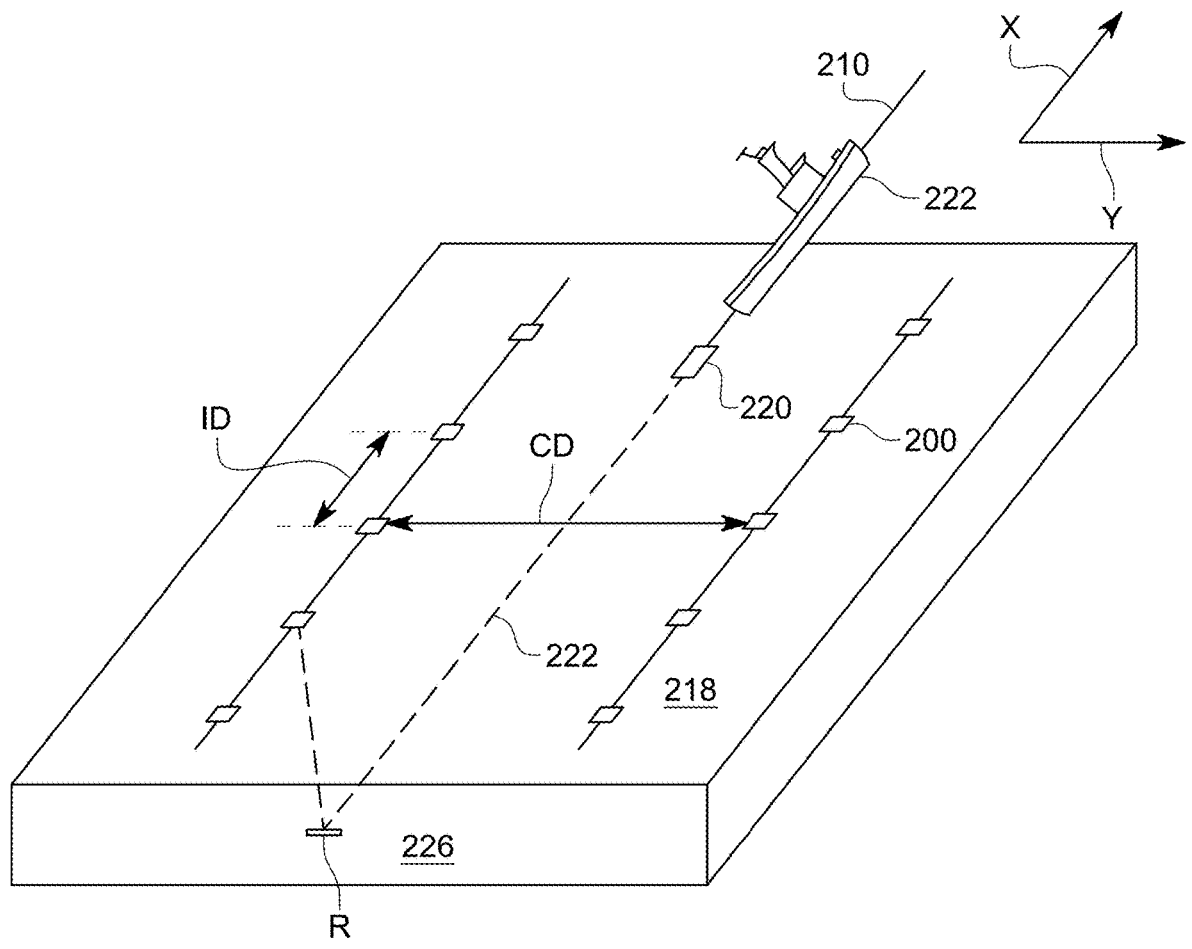
FIG. 2 is a schematic illustration of a seismic data acquisition system that uses ocean bottom nodes.

The following description of the embodiments refers to the accompanying drawings. The same reference numbers in different drawings identify the same or similar elements. The following detailed description does not limit the invention. Instead, the scope of the invention is defined by the appended claims. For simplicity, the following embodiments are discussed with regard to a marine seismic system that survey a subsurface for oil and gas resources. However, the embodiments discussed herein are equally applicable to any subsurface resource, for example, geothermal or hydrothermal exploration and exploitation, carbon capture and storage, ore detection, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel seismic acquisition data methodology is employed for reducing the cost and time associated with OBN data while also improving the subsurface imaging by utilizing mini-streamers whose inline and crossline receivers' separation are coordinated with those of the OBNs. In one application, the node dataset and the mini-streamer dataset are simultaneously acquired and used together with a traditional data set (OBN or streamer) for further improving the subsurface imagining. For example, a method for using the above datasets may include defining an optimal receiver and source grid to achieve adequate coverage criteria, utilization of mini-streamers (and/or Near Field Hydrophone (NFH)) towed by the source vessel to improve for near offset coverage, joint processing of the acquired node data, mini-streamer data, and existing towed streamer seismic data utilizing Earth reflectivity as a key criterion. For imaging, the joint pre-stack inversion either through Least Square Migration or full waveform inversion (FWI) imaging can enhance resolution, suppress migration artifacts, and balance subsurface illumination.

According to an embodiment, the system and method that acquire and process the node and mini-streamer datasets take full advantage of (i) the prior knowledge of the subsurface from existing data, proprietary (if allowed) and public information within the geoscience community, (ii) the various source types, blended acquisition methodologies, source diversion and steering technologies available on marine seismic systems, (iii) the real time positioning of the seismic equipment, (iv) the recent improvements in node sensors and associated deployment techniques, and (v) the recent improvements in mini streamer technologies.

The proposed method will bring several benefits to seismic exploration and asset development, especially near-field opportunities, by: (1) improving subsurface imaging and reducing geological and geophysical uncertainties due to better OBN FWI velocity and enhanced imaging from OBN and complementary datasets, (2) reducing environmental footprint by eliminating the need to have multiple surveys for optimal imaging, (3) reducing capital expenditure for exploration, and (4) minimizing acquisition time and associated health, safety and environment (HSE) exposure.

The optimal sampling of the subsurface is needed to achieve a representative seismic image of the subsurface. Sampling required during the data acquisition is very much dependent on the subsurface complexity and hence widely varies. To obtain an optimal subsurface sampling, the main factors evaluated during a marine survey design phase are bin size, structural dips, lateral velocity contrasts, depth and resolution required for target, maximum offset, fold and aperture. These factors are impacting the novel system and method proposed herein, and thus, these factors are now briefly discussed.

Initial maximum acceptable bin size can be estimated by calculating the maximum unaliased frequency required for given maximum dip of events in the subsurface. A bin is typically a given square or rectangular imaginary area on or under the ocean bottom having a size in the tens of meters. Considering diffractions in the datasets, a minimum dip of ~45° is considered for all cases. In general, the maximum bin size, X, can be defined as $$X = \frac{V}{2nf\sin(\theta)} \le \frac{V}{4f\sin(\theta)} \approx \frac{V}{2.8f},$$

where V is the velocity of the propagating wave in a given layer, n is the number of cycles, f is the frequency of the recorded wave, and θ is the angular dip of the reflector. The above definitions are only fully applicable to a constant velocity layer. For a more complex overburden, sophisticated approaches involving FWI and migration of the forward modelled data will be required. Stacking within the bin can also attenuate the energy of an event that has a dip across a bin.

The maximum offset for a seismic survey has a large impact on the overall survey cost irrespective of land/marine acquisition. The offset is considered to be the distance, between the source and the first receiver (or another receiver) on the streamer. Thus, the receivers on the streamer that are proximal to the vessel (and implicitly to the source) are considered to be near offsets and the receivers on the streamer that are distal to the vessel are considered to be the far offsets. The required maximum offset is arrived upon by estimating the deepest target depth R, interference with direct waves, normal moveout (NMO) stretch effects and critical offset required at target depth. The angle at which refraction occurs at an interface can be computed based on the velocity variation across the interface and incidence angle. From Snell's law, $$\sin(\theta) = \frac{V1}{V2},$$

where V1 and V2 are the velocities of the wave above and below the interface, and V1<V2.

In this context, it is also desired to consider the critical distance, i.e., the distance at which the refracted wave is first observed according to ray theory, and the overtaking distance after which the refracted arrivals will be earlier than the direct arrivals. Considering constant velocity flat layers and ray assumption, the critical distance is given by $\Delta_c = 2h\tan\theta$, where θ is the critical angle and h is the depth to the interface. Under the same assumptions, it is possible to further compute the overtaking distance, i.e., the distance at which the refracted arrival overtakes the direct arrival, as being $$\Delta_u = 2h\sqrt{\frac{v2 + v1}{v2 - v1}}.$$

Although a larger minimum near offset is economically appealing, this can impact the ability to image shallow geology. Hence, the critical distance is an important parameter to evaluate during the survey design phase. To guarantee good imaging of shallow geology layers with strong velocity contrast, it is preferred to have good near offset coverage within the critical distance. At the same time, one might prefer to have an offset longer than the overtaking distance: "clean" section of refraction energy without strong interference from other waves (direct arrival, guided waves, etc) can be important for model building steps like full waveform inversion, refraction tomography and so on.

The bin size and the maximum offset typically set the geometry and fold for marine seismic surveys. In this regard, there are well defined criteria (see, for example, Krey, Th C., 1987, Attenuation of random noise by 2D and 3D CDP stacking and Kirchhoff migration: Geophysical Prospecting, 35, no. 2, 135-147, https://doi.org/10.1111/j.1365-

2478.1987.tb00809.x.) for the accurate estimation of the fold and aperture and thus, these two parameters are not discussed herein.

Another design consideration for seismic surveys lately is the design's "friendliness" to the FWI processing. The FWI can dramatically change the understanding of the subsurface by reconstructing a model of the velocity field that accurately explains the recorded seismic data. With high-frequency FWI, it has been shown recently [1] that detailed subsurface property models generated with FWI have provided an accurate description of the overburden complexity and helped mitigate imaging distortions. The resulting imaging uplift has enabled improved structural definition, stratigraphic characterisation of the reservoir, and quantitative interpretation.

Recent evaluations on the OBN datasets and published research by Huang et al., (see, for example, https://doi.org/10.1190/tle40050324.1) indicates that with FWI frequencies equivalent to the bandwidth needed for imaging, the reflectivity image directly output from FWI often provides additional structural information with better illumination and higher signal-to-noise ratio naturally as a result of many iterations of least-squares fitting of the full-wavefield data. Note that the seismic acquisition is typically done at 2 ms sampling, which results in the Nyquist limit at 250 Hz. However, due to the attenuation, the frequency at the desired targets are often much lower. This expected frequency at depth for a target is considered for the modelling exercise to optimise sampling parameters.

To derive an optimized sampling grid for acquisition, the above-mentioned variables are first estimated after interrogating the existing data for a given area. Subsequently, these parameters are validated through 3D full waveform modelling followed by FWI and migration, during which attributes like illumination (diving wave, reflection and so on) patterns and trace amplitudes are also evaluated.

According to an embodiment, the subsurface sampling achieved using OBN receivers is optimized by acquiring distinctive, complimentary, sparse node and mini-streamer datasets, which can be further enriched by using the existing seismic data for the target area, being it towed streamer or OBN. The terms "sparse nodes" and "mini-streamers" are understood in the following embodiments to refer to nodes that are separated, along the crossline direction, by more than 600 m, and to streamers having a length of less than 3,000 m, respectively. Note that the typical nodes are distributed along the cross-line direction with a distance between 300 and 400 m while the streamers have a length more than 3,000 m. Thus, the sparse nodes and mini-streamers are different from the typical nodes and streamers in the art. This means that the acquired data corresponding to these configurations is different from the typical node and streamer data. Also note that the sensor distribution along a given streamer is typically about 12.5 m or less. However, the signals (traces) from plural sensors (a group of sensors) may be combined together to form a single trace. In other words, each trace that is used for analysis may be recorded by a single sensor or by a group of sensors. If the trace is the result of recordings from a group of sensors, then the trace spacing is given by the distance between such groups, and not individual sensors.

In one embodiment, not only the sparse nodes and short streamers are used instead of the typical nodes and streamers, but their inline and crossline characteristics are coordinated, to obtain "correlated sparse nodes and mini-streamers," i.e., a configuration in which the crossline distance covered by the mini-streamers between adjacent lines of sparse nodes is mathematically related to the crossline distance of the sparse nodes, and the inline length of the mini-streamer is mathematically a function of the inline separation of the sparse nodes. In this regard, in one embodiment, if the inline distance between the sparse nodes is between 100 and 300 m, the length of the mini-streamers could be between 200 and 600 m, respectively, i.e., twice the inline distance of the nodes. In one application, it is possible that the length of the mini-streamers is up to three time the inline distance of adjacent nodes. Further, if the crossline distance between the sparse nodes is 900 m, the mini-streamer spread has a width of about 1200 m (e.g., 12 streamers, each pair of adjacent cables being separated by 100 m) so that after 6 passes of the vessel towing the source and the streamer spread, the streamer spread has completely covered the crossline distance between two adjacent nodes to provide near angle coverage with relatively dense angle sampling along crossline direction for shallow geology events. For the above discussion, it was assumed the triple-source setting with crossline source separation 50 m (100 m outer to outer, 150 m sail line spacing).

In other words, the correlated sparse nodes and mini-streamers system is characterized by a length L of the mini-streamers being N times the inline distance I of the nodes (capital letters are used for the streamers and small case letters are used for the nodes), where N is 2, 3 or more. In one application, $L \leq 3$ l, i.e., the length L of the mini-streamers is equal to or less than three times the distance I between two adjacent nodes along the inline direction. In one embodiment, the relationship $L \leq 3$ l is further limited by a hard limit on the length of the mini-streamer, i.e., $L \leq 3$ km. In this or another embodiment, there is a relationship between the number of channels (or traces) N that the mini-streamer has, and the inline distance I between consecutive nodes. If the streamer has N channels, each pair of adjacent channels is separated by a distance M, where a channel corresponds to a single sensor or a group of sensors that are processed together, then the number of channels N necessary to acquire the seismic data obeys the relationship $N \leq 3l/M$. For example, if M is 12.5 m and I is 300 m, then the number of channels N necessary is $3 \times 300/12.5 = 72$. This corresponds to $L = 72 \times 12.5 = 900$ m. The distance M may also be 3.125, 6.25, 25 m, etc. or even lower than 3.125 for Ultra High Resolution Cables. For M=3.125 and I=300, the number of channels N is 288 and L is 900 m or less. Further, the correlated sparse nodes and mini-streamers may also be characterized by the streamer spread having a width W (along the cross-line direction) substantially equal or larger than a distance w between two adjacent lines of nodes (along the cross-line direction). The streamer spread travels the distance between the adjacent lines 332 of nodes M times. For a node line spacing of 600 m and a 50 m shot spacing with triple-source setting, the sail line spacing 150 m leads to M=4.

Figure 3:
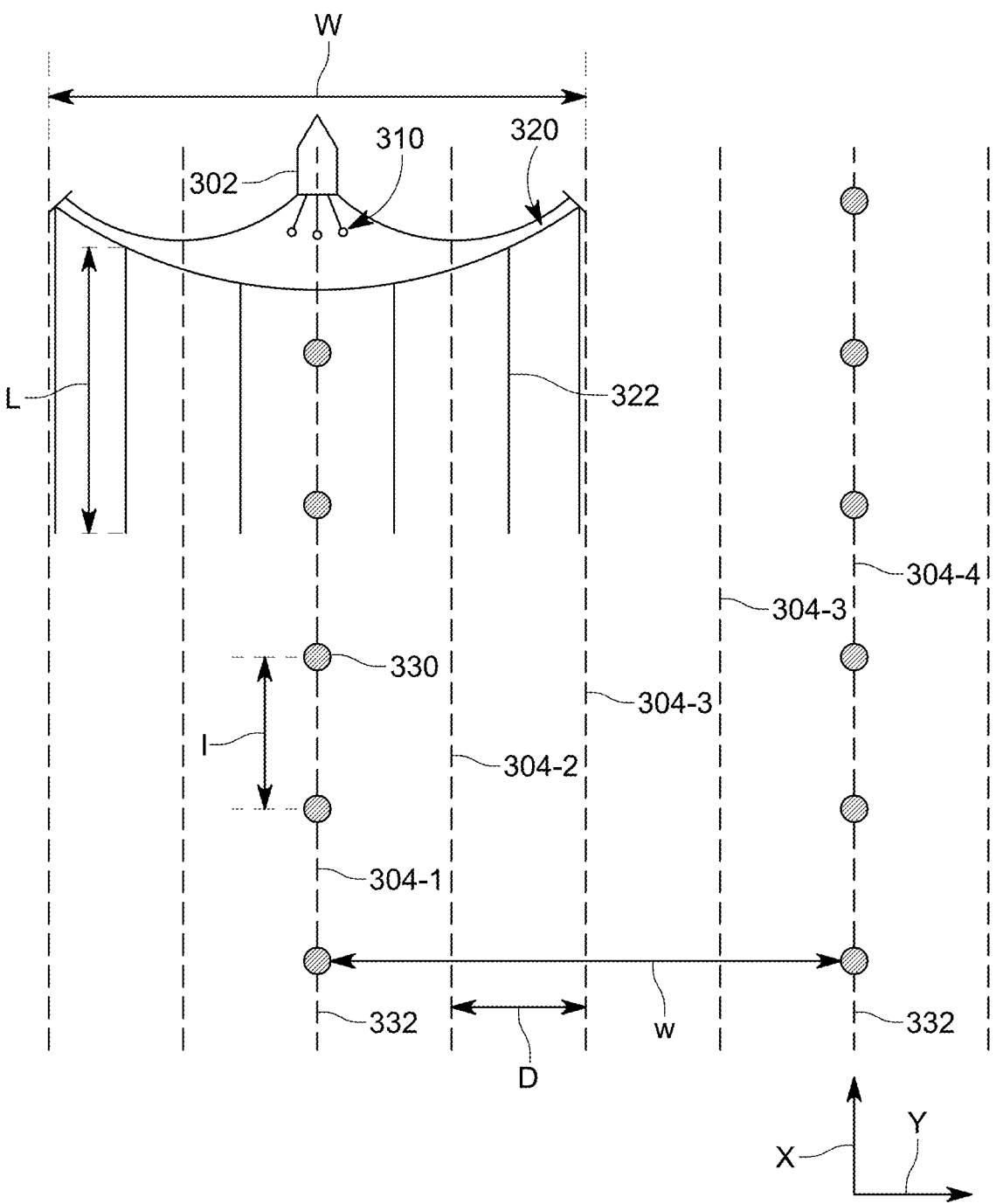
FIG. 3 illustrates a correlated sparse nodes and mini-streamers system for collecting hybrid seismic data.

For example, as shown in FIG. 3, a correlated sparse nodes and mini-streamer system 300 includes a vessel 302 that simultaneously tows plural sources 310 (three in this case) and plural mini-streamers 322 that form the streamer spread 320. A width of the streamer spread 320 is W, a length of a streamer is L, an inline distance between adjacent nodes 330 is I, and a crossline distance between adjacent nodes 330 is w. The nodes are distributed along parallel straight lines 332. The nodes 330 can be attached to the ocean bottom or can float in the water (for example, can be located on corresponding autonomous underwater vehicles). The vessel follows sail lines 304-I (only sail lines I=1 to 4 are labelled in the figure). It is noted that some of the sail lines (e.g., 304-1 and 304-4) coincide in the crossline direction with the node lines 332. It is also noted that after sailing along four consecutive sail lines 304-I, the vessel 302 sails again above a node line. For this specific embodiment, the node inline spacing I may be 300 m, the length L of the streamer could be 600 m, i.e., twice the distance I, the distance D between adjacent sail lines is 225 m, there are 12 streamers, the width W of the streamer spread is 1200 m, and the distance w between adjacent nodes is 900 m, i.e., the streamer spread width W may be larger than the distance w between adjacent nodes. Those skilled in the art would understand that this is just an example and other values for all these lengths and widths may be used depending on the type of the subsurface, the depth of the target, the used frequency, etc. For example, if both near angle sampling and dense angle sampling for wider angle range is important to de-risk the exploration and production activity for relatively shallow prospects, the length L of the streamer could be more than double of node inline spacing I, to provide the needed illumination. In the example with 300 m WB, shot grid 50 m×50 m, the streamer will have offsetx increment 100 m, and for shallow reflector at 600 m, 600 m cable can cover angle up to 27°, with angle sampling ~4.5°. For the reflector at 1,200 m depth, a 600 m cable will cover an angle up to 14°, and a 1000 m cable will cover an angle up to 23°.

In simple geology with sufficient illumination, usually migrated gather curvature and attributes like AVO/AVA can be reliably extracted from inline direction. There are cases where crossline reflection angle coverage and sampling rate is important due to factors like strong azimuthal anisotropy, complex illumination pattern due to overburden, etc. In sparse node survey, the node crossline spacing w between 600 m to 1000 m leads to offsetx increment between 1200 m to 2000 m, thus the reflection angle sampling by OBN data will be very sparse. In FIG. 3, the distance w between adjacent nodes is 1100 m, and the width W of the streamer spread is 1200 m, thus mini-streamer can provide the near reflection angle coverage and sampling density along crossline direction not possible by OBN. With 100 m cable spacing, the offsety increment will be 200 m if shot grid is smaller than 100 m, streamer data can provide 4 offsets (0 m, 200 m, 400 m, 600 m) coverage which could be important for shallow geologies.

While the embodiment illustrated in FIG. 3 has the length of the mini-streamers double the inline node spacing, in another embodiment it is possible to have a length of the mini-streamers double a crossline node distance, assuming that the crossline distance is bigger than the inline spacing, and the mini-streamer spread can be as wide as desired as long as the acquisition efficiency will not be affected.

The most significant challenge of the OBN datasets, and made acute by sparser crossline receiver spacing, is the COV coverage. The configuration shown in FIG. 3 overcomes this problem by utilizing the spread 320 of mini-streamers, towed behind the source vessel 302 used for the OBN acquisition, to improve the near offset sampling. Variations of the sizes shown in FIG. 3 are possible and acceptable depending on individual scenarios.

Figure 4:
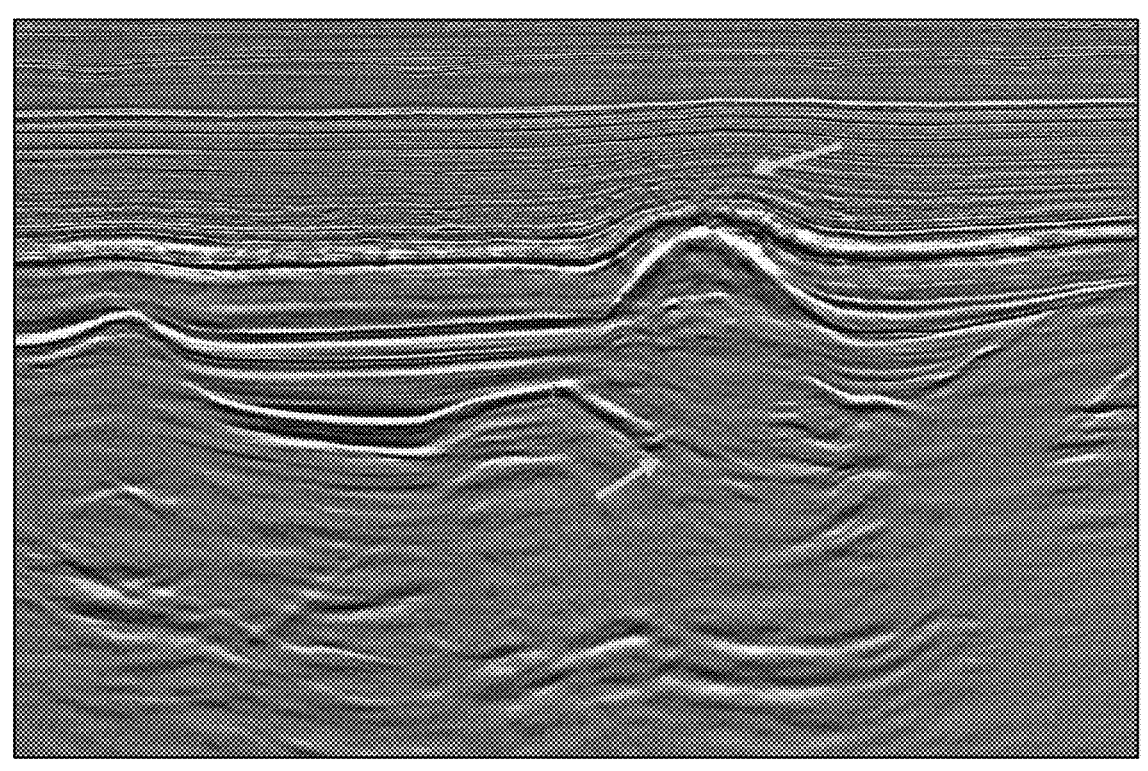
FIG. 4 illustrates a seismic dataset acquired with ocean bottom nodes distributed with a traditional density.
Figure 5:
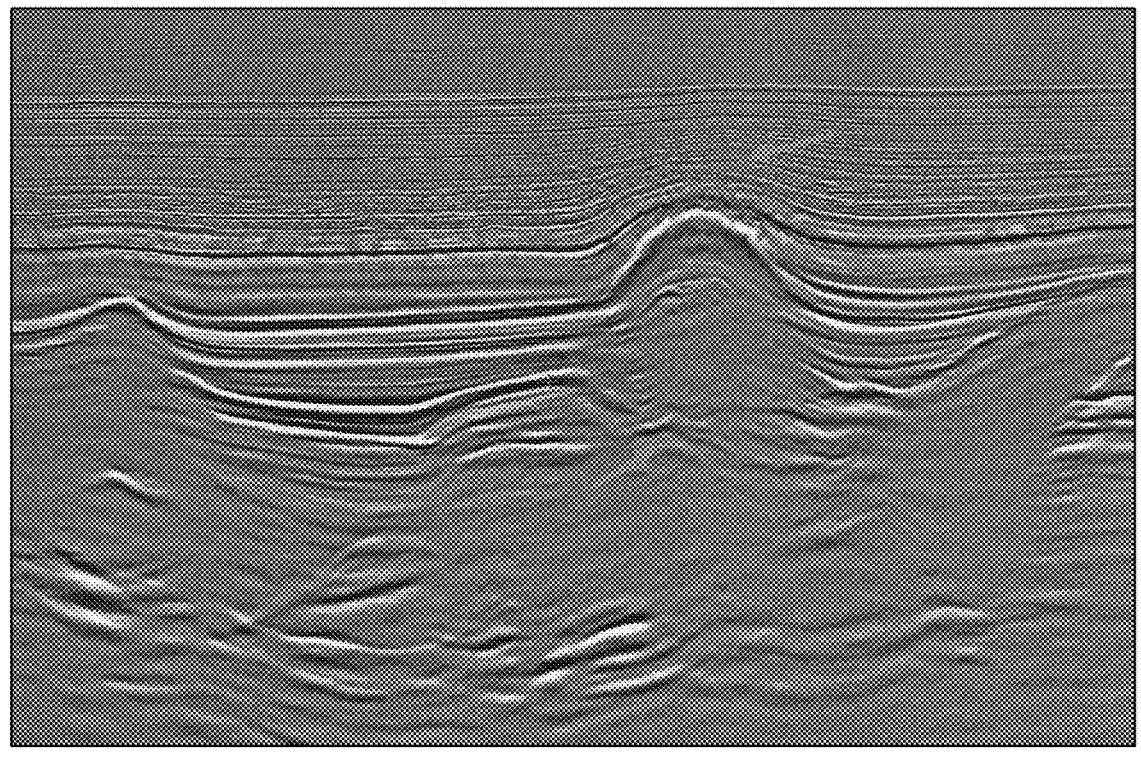
FIG. 5 illustrates a seismic dataset acquired with traditional long streamers.
Figure 6:
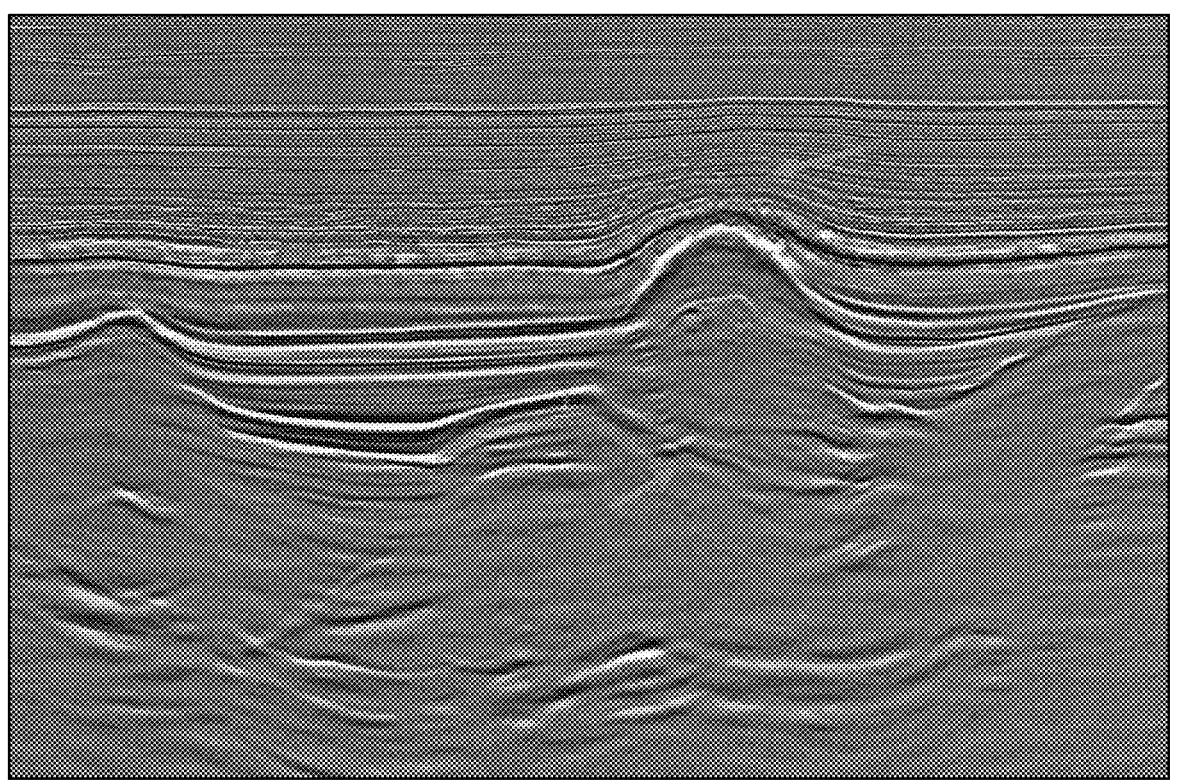
FIG. 6 illustrates a seismic dataset acquired with the correlated sparse nodes and mini-streamers system.
Figure 7:
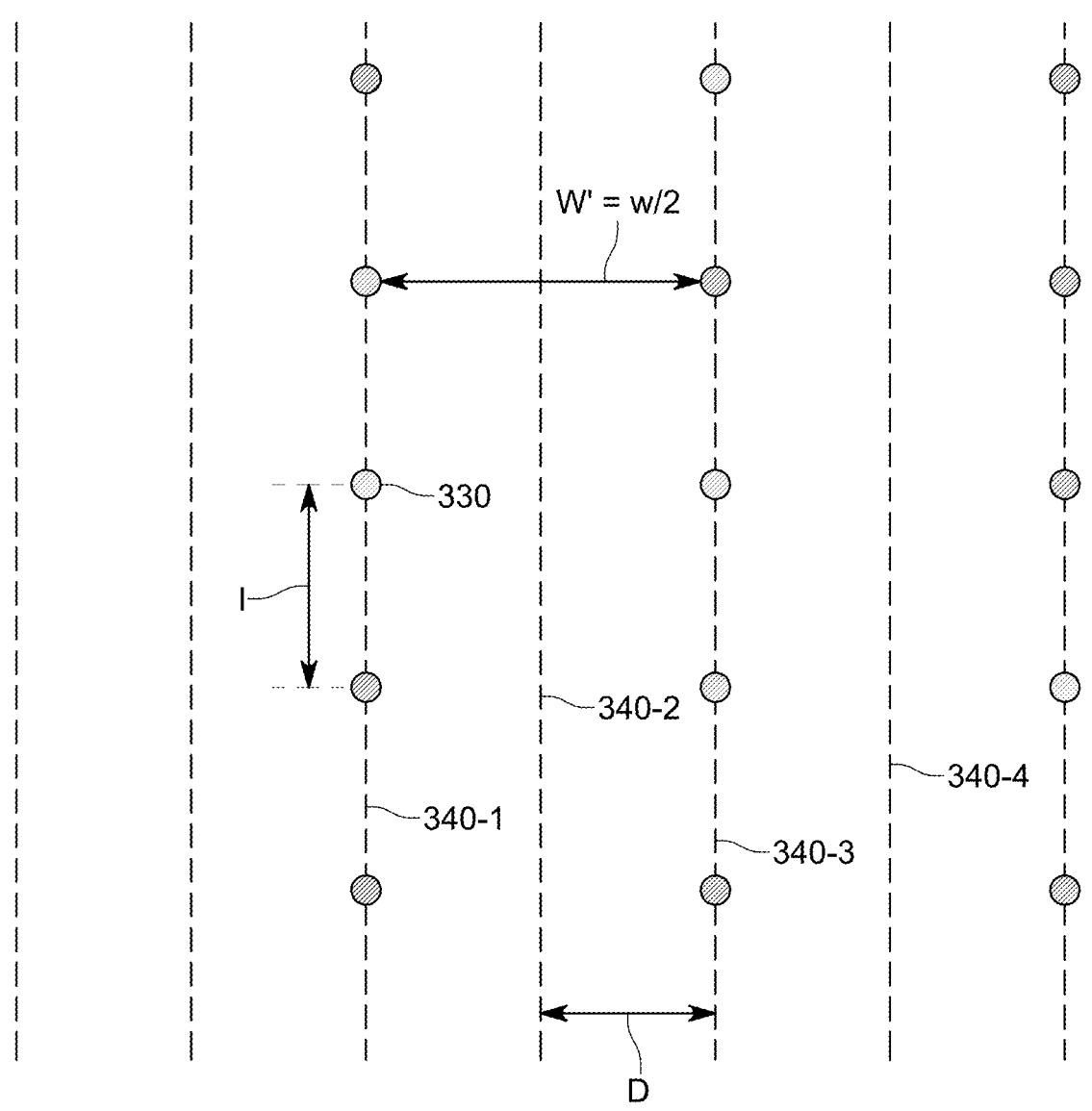
FIG. 7 illustrates the configuration of the traditional ocean bottom nodes.

In one application, a traditional OBN system uses a receiver spacing of 100 and 300 metres for inline and crossline, respectively. Modelled parameters were verified using an existing OBN data set in the area. For a deep-water setting, the inventors arrived at a node spacing of 400×400 m using the same methodology, without any optimization discussed herein. In both scenarios, S wave sampling was also considered together with P wave sampling. In this regard, FIG. 4 shows a baseline survey of a given area performed exclusively with OBNs having a standard configuration, which is illustrated in FIG. 7 (note that the density of the nodes 330 in FIG. 7 is twice as high as the density of the nodes in FIG. 3), while FIG. 5 shows a survey of the same area performed exclusively with towed streamers having a length of 8,000 m. When the same area is surveyed with the configuration shown in FIG. 3, it is expected that the seismic data shown in FIG. 6 to be acquired. The arrows in these figures point to the same subsurface features, which show that the dataset of FIG. 6 capture these features with the same if not a better resolution. It is noted that the dataset shown in FIG. 4 has been acquired with very dense nodes (100×300 m), the dataset shown in FIG. 5 has been acquired with long streamers (8,000 m) while the dataset shown in FIG. 6 is simulated for less dense nodes (100×900 m) and much shorter streamers (about 200 m). Even if the quality of the obtained data set in FIG. 6 is not better than those shown in FIGS. 4 and 5, the cost and time for setting such a survey is much improved due to the reduced density of the nodes and the short length of streamers.

The derivation of the optimized grid of OBNs is based on illumination analysis of the target and the subsequent computation of the surface grid and OBN patch area requirement for optimal illumination. The required acquisition grid can then be modelled and compared against the illumination analysis for validity. Previously acquired towed streamer data may be utilized for the modelling purpose as well. For clarity, the optimized node design shown in FIG. 3 does not have to follow a regular grid practice. Variable inline and cross line spacing within a survey is possible, again depending on the geology driven illumination challenges.

Figure 8:
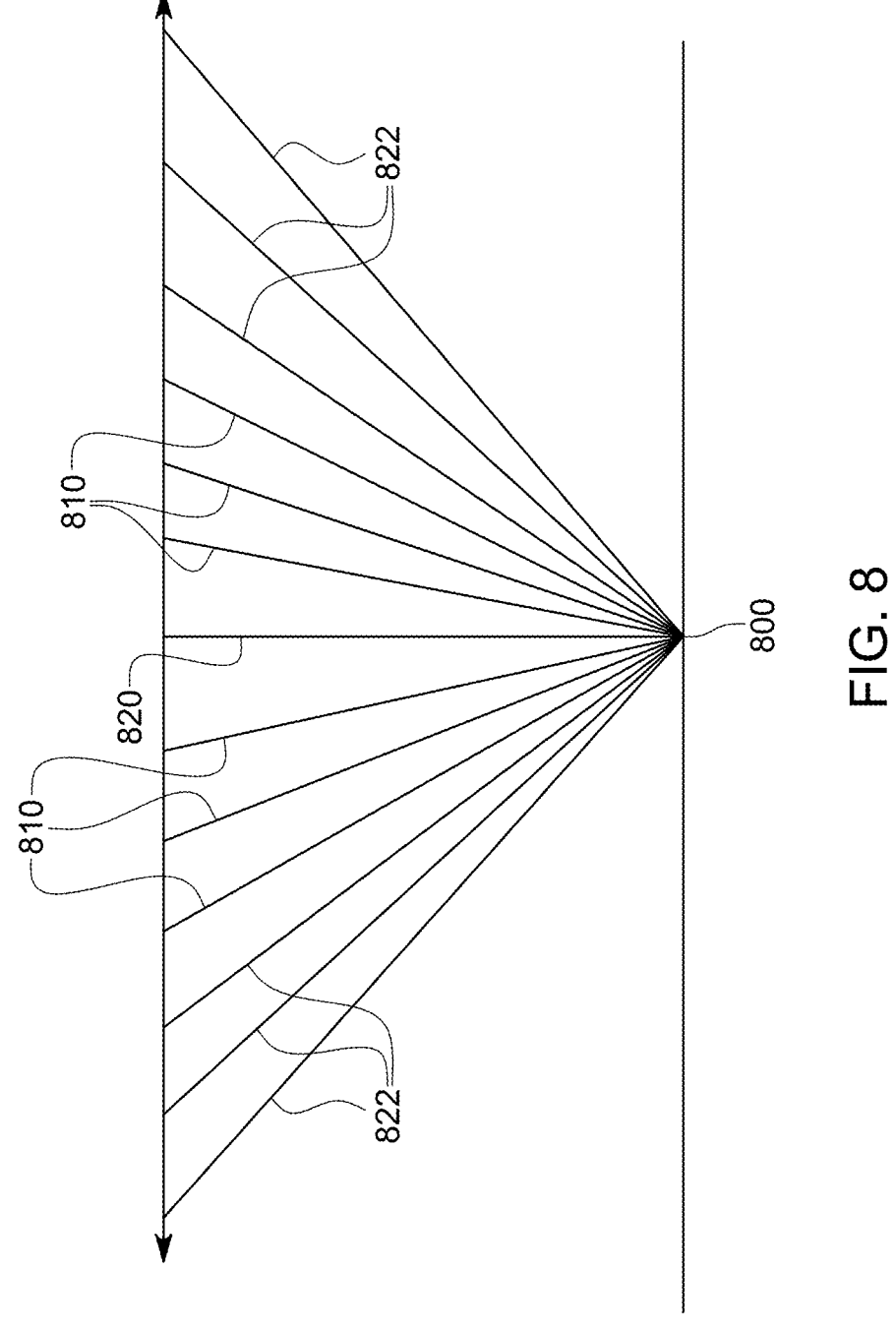
FIG. 8 illustrates the common medium point position for waves recorded by the mini-streamers and the nodes.

FIG. 8 shows the combination of mini-streamer and OBN data for a CMP position 800. For a shallow single layer, the offsets contributing by the mini-streamer are denoted by lines 810 and those contributed by the OBN are denoted by lines 820 and 822. The overlapping coverage was not added as a map, which will be the case when a multi-layered geology is considered.

There are various types of mini-streamers available in the industry and they are significantly different from a typical marine long offset towed streamer. Although both may contain a pressure sensor and a particle sensor, the individual sensors are more closely spaced (with inline spacing between sub 1 meter to 3.125 meter mostly) in the mini-streamers to achieve smaller bin sizes and they are also towed shallower (2-10 m from sea surface) to improve bandwidth in the higher frequencies. Hence this dataset can also be utilized to generate standalone high-resolution images of the near surface, further reducing the environmental footprint of the seismic surveys.

The number of sources 310 used for the survey is proposed to be flexible and to be determined based on modelling for individual scenarios. The recorded Near Field Hydrophones (NFH) can also compliment the mini-steamer dataset as they are effectively zero offset seismic. NFH datasets are typically single channel and hence processed separately in practice.

Figure 9:
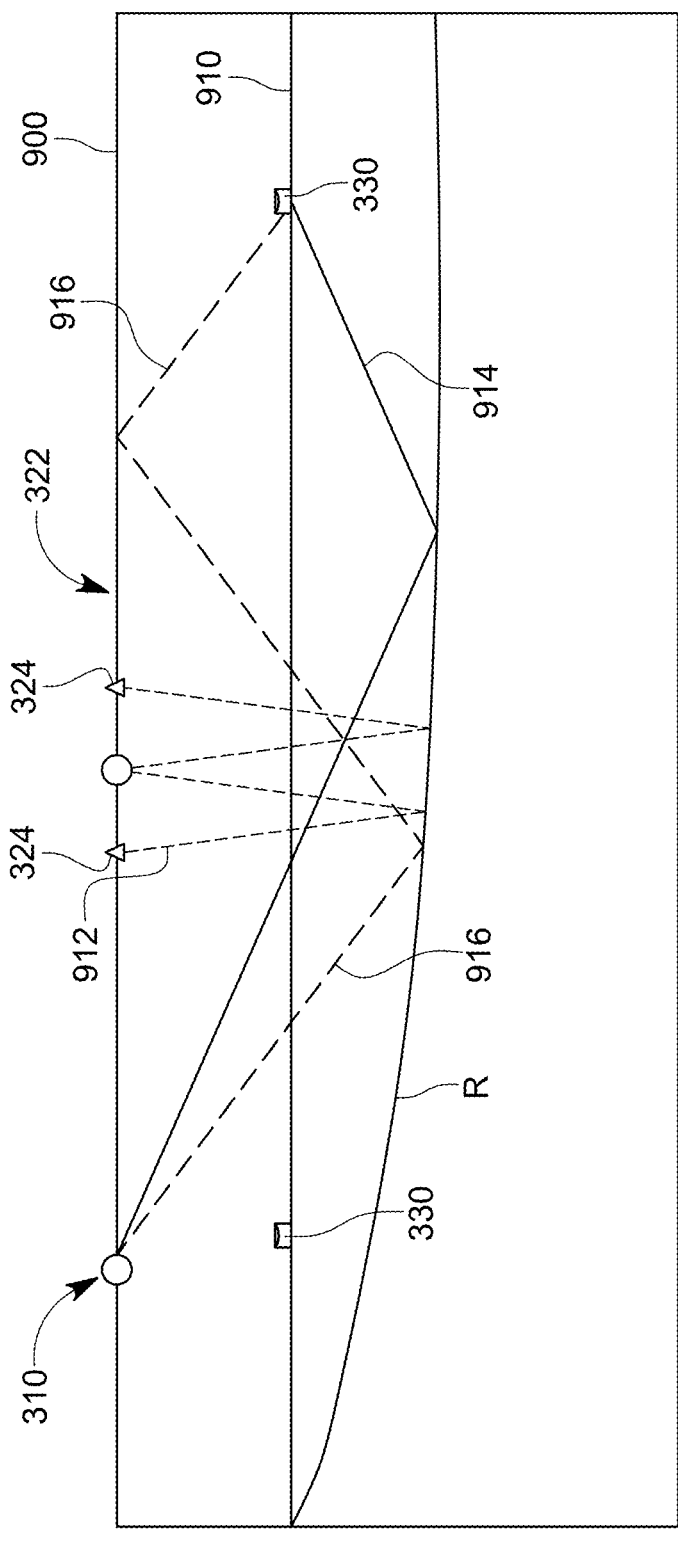
FIG. 9 illustrates how the mini-streamers complement the seismic data acquired by an ocean bottom node system for a given reflector.

In another embodiment, the inventors propose the use of the existing towed streamer and/or OBN data (i.e., prior acquired seismic data) to improve the sampling gaps left between the mini-streamer and OBN receivers. This creates a further significant challenge for seismic imaging as the two datasets (mini streamer/towed seismic vs. OBN) are not co-located and hence the recorded wave fronts are at different stages of propagation. As illustrated in FIG. 9, the mini-streamer receivers 324 are located at the water surface

900 while the nodes 330 are located on the ocean floor 910. FIG. 9 also shows the reflector of interest R, below the ocean floor 910. This challenge is proposed in this embodiment to be negated by utilizing reflectivity-based imaging techniques.

More specifically, as illustrated in FIG. 9, those two non-co-located datasets sample the same subsurface reflectivity R. For a shallow water environment, between neighbour nodes 330, the mini-streamer 322 can provide near angle coverage (dotted lines 912) for shallow reflectors not possible to be illuminated from either OBN up-going (solid lines 914) or down-going (dashed lines 916) waves. Using this common reflectivity as a constraint, an inversion-based solution is proposed to merge the sparse node and mini-streamer datasets. The additional near angle illumination 912 provided by the mini-streamer spread 320 can enhance the shallow section resolution and speed up the inversion convergence. There are multiple routes to achieve this goal. Two examples would be Least Square Migration techniques where the velocity is fixed (if there is high confidence in the velocity), and FWI imaging techniques which extract subsurface reflectivity from the FWI model.

In all cases, it is to be noted that this novel configuration and method do not require simultaneously acquired towed long offset streamer dataset and OBN dataset, to create a meaningful image of the subsurface for the area being explored. This significantly lowers the environmental footprint of the survey, creates a commercially advantageous and more flexible design envelope for the source and OBN sampling. This methodology lends itself to undertake variable node sampling to effectively address the variability of geological complexity within the exploration area under thus keep costs under check.

Figure 10:
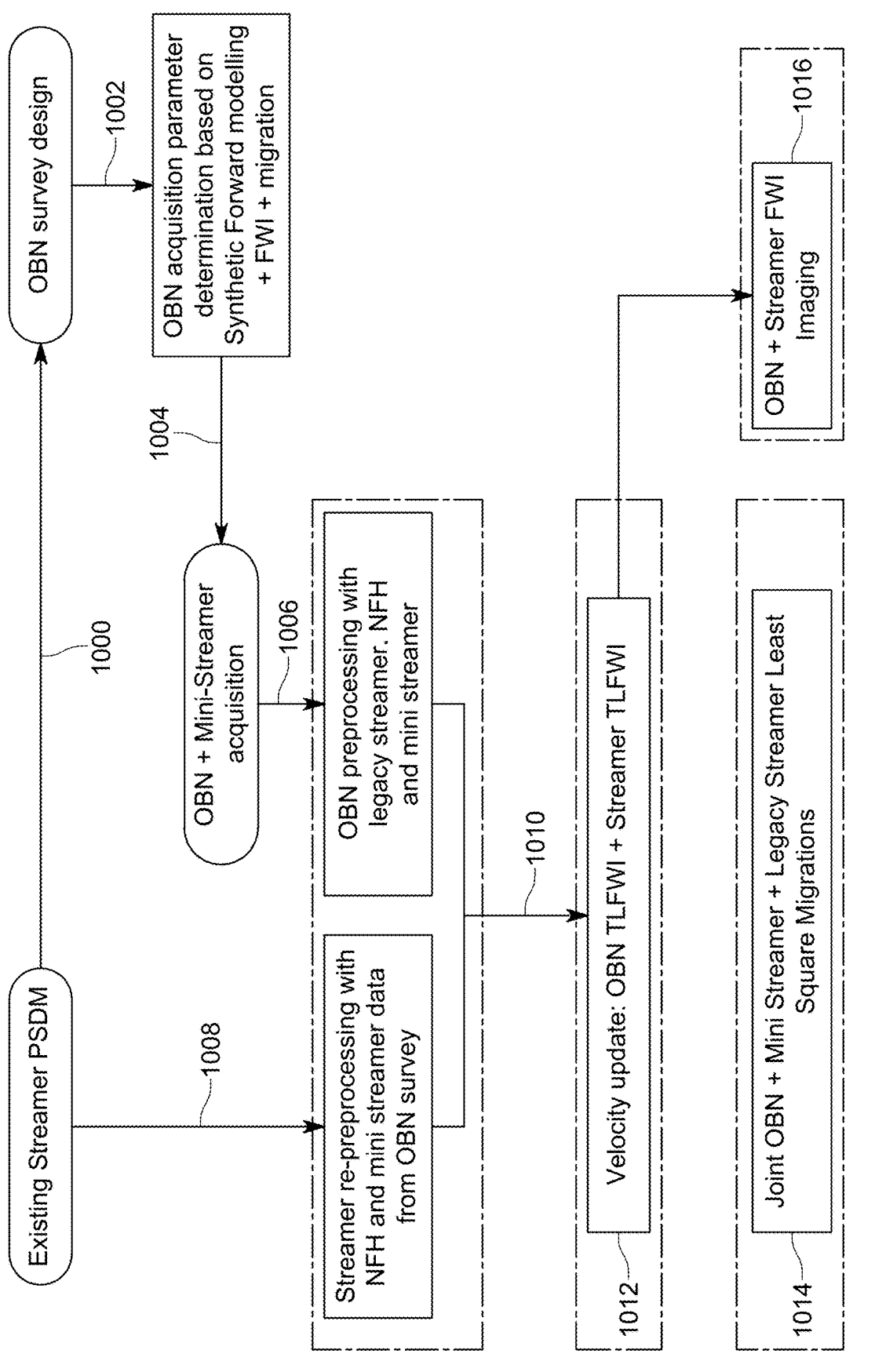
FIG. 10 is a diagram of various steps for processing the acquired seismic data for generating an image of the surveyed subsurface.

The methodology discussed above can be summarized in regard to FIG. 10 as now discussed. In step 1000, from existing streamer data, a pre-stack depth migration (PSDM) may be performed and this data is used to design an OBN survey. Then, in step 1002 the OBN acquisition parameter determination is performed based on synthetic forward modelling and FWI and migration. In step 1004, the sparse OBN and mini-streamer configuration shown in FIG. 3 is used to acquire new seismic data. In step 1006, the new seismic data is OBN preprocessed with legacy streamer, NFH and mini-streamer. In step 1008, the existing streamer data is re-processed with NFH and mini-streamer from the OBN survey and the data sets obtained in steps 1006 and 1008 are combined in step 1010. In step 1012, the velocity model is updated based on the OBN and streamer data, and in step 1014 the data sets from the sparse OBN, mini-streamer and legacy streamer least square migrations are merged to generate a final image of the subsurface. In step 1016, it is possible to generate an image of the subsurface based only on the sparse OBN and mini-streamer datasets using FWI imagining.

Some of possible technical and/or commercial advantages of the proposed correlated sparse nodes and mini-streamers configuration are now discussed. The proposed combination can substantially reduce the cost in comparison to the current Ocean Bottom data acquisition techniques, while delivering a scalable high-quality image of the subsurface. Current sparse OBS acquisition methodologies result in an inadequately sampled subsurface, especially near surface, that subsequently limits detailed imaging of the geological targets and the overburden. The proposed novel methodology can also provide, when used in combination with proprietary full wavefield imaging methodologies, highly detailed shallow subsurface image that further reduces the need for alternate datasets to mitigate drilling hazards (shallow hazard cube), well placement and sub-surface planning. Although the authors do not claim that the optimized image achieved using the methodology outlined here will be at par or better than the non-optimized denser OBN grid, i.e., the imaging results from the described optimized solution are very close to the non-optimized denser OBN grid, in certain embodiments it is possible that a superior image of the subsurface is obtained with the method illustrated in FIG. 10.

The disclosed embodiments provide a correlated sparse nodes and mini-streamers data acquisition system for achieving an image of a subsurface faster and cheaper than the existing OBN or OBN plus traditional streamer configurations. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] P Routh et al., 2017, Impact of high-resolution FWI in the Western Black Sea: Revealing overburden and reservoir complexity, The Leading Edge 36: 60-66, http://dx.doi.org/10.1190/tle36010060.1.

What is claimed is:

1. A seismic data acquisition system, the system comprising:

plural sparse nodes arranged on the ocean bottom with a crossline distance w between adjacent nodes, of the plural sparse nodes, of at least 600 m; and a mini-streamer spread that includes plural mini-streamers with a length L less than 3000 m, wherein inline and crossline characteristics of the plural sparse nodes and the mini-streamer spread are coordinated so that, when recording seismic data associated with one or more sources, an inline separation I between adjacent nodes among the plural sparse nodes and the length L of the mini-streamer spread are correlated according to a predetermined mathematical relationship configured to compensate for near-offset and reflection-angle sampling gaps introduced by the crossline distance w, such that $L \leq 3\,l$, a crossline width W of the mini-streamer spread is equal to or larger than the crossline distance w of the plural sparse nodes, and a crossline distance covered by the mini-streamer spread based on a predetermined number of passes selected as a function of the crossline distance w, between adjacent lines of sparse nodes of the plural sparse nodes, is mathematically related to the crossline distance w of the plural sparse nodes.

2. The system of claim 1, wherein the length L of the plural mini-streamers is an integer multiple of the inline separation I between adjacent nodes among the plural sparse nodes.

3. The system of claim 1, wherein the crossline width W of the mini-streamer spread is determined based on the crossline distance w between adjacent lines of the arrangement.

4. The system of claim 3, wherein the crossline width W of the mini-streamer spread is substantially equal to the crossline distance w between the adjacent lines of the arrangement.

5. The system of claim 1, wherein the crossline distance w of the plural sparse nodes is equal to the number of passes times the crossline width W of the mini-streamer spread.

6. The system of claim 1, wherein an inline distance between adjacent among the plural sparse nodes is at least 100 m.

7. The system of claim 1, wherein the plural sparse nodes are attached to the ocean bottom.

8. The system of claim 1, wherein the crossline distance w between adjacent nodes is about 900 m.

9. A seismic data acquisition method comprising:

arranging plural sparse nodes on the ocean floor bottom with a crossline distance w between adjacent nodes, of the plural sparse nodes, of at least 600 m;

towing one or more sources configured to generate seismic waves and a mini-streamer spread including plural mini-streamers with a length L less than 3000 m along an inline direction, above the plural sparse nodes; and acquiring seismic data using the plural sparse nodes and seismic receivers distributed along mini-streamers of the mini-streamer spread when the one or more sources are fired while towed above the plural sparse nodes, wherein inline and crossline characteristics of the plural sparse nodes and the mini-streamer spread are coordinated so that, when recording the seismic data, an inline separation I between adjacent nodes among the plural sparse nodes and the length L of the mini-streamer spread are correlated according to a predetermined mathematical relationship configured to compensate for near-offset and reflection-angle sampling gaps introduced by the crossline distance w, such that $L \leq 3\,l$, a crossline width W of the mini-streamer spread is equal to or larger than the crossline distance w of the plural sparse nodes, and a crossline distance covered by the mini-streamer spread based on a predetermined number of passes selected as a function of the crossline distance w, between adjacent lines of sparse nodes of the plural sparse nodes, is mathematically related to the crossline distance w of the plural sparse nodes.

10. The method of claim 9, wherein the length L of the mini-streamers is an integer multiple an inline separation I of adjacent nodes among the plural sparse nodes.

11. The method of claim 9, wherein the crossline width W of the mini-streamer spread towed between adjacent lines of the arrangement of the plural sparse nodes is determined based on the crossline distance w between the adjacent lines.

12. The method of claim 9, wherein the crossline distance w of the plural sparse nodes is equal to the number of passes times the crossline width W covered by the mini-streamer spread.

13. The method of claim 9, wherein the width W of the mini-stream spread is substantially equal to the crossline distance w between adjacent lines of the plural sparse nodes.

14. The method of claim 9, wherein sail lines along which a vessel tows the one or more sources and the mini-streamer spread are directly above inline lines of the arrangement of the plural sparse nodes.

15. The method of claim 14, wherein the vessel tows the one or more sources and the mini-streamer spread along additional sail lines that are equidistant between the sail lines directly above the inline lines of the arrangement of the plural sparse nodes.

* * * * *